(12) United States Patent
Mueller et al.

(10) Patent No.: US 9,600,749 B2
(45) Date of Patent: Mar. 21, 2017

(54) METHOD FOR PRINTING AT LEAST ONE CARRIER ELEMENT

(75) Inventors: Asmus Mueller, Bettlach (CH); Gerhard Bolli, Andhausen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/115,931

(22) PCT Filed: Mar. 16, 2012

(86) PCT No.: PCT/EP2012/054628
§ 371 (c)(1),
(2), (4) Date: Feb. 3, 2014

(87) PCT Pub. No.: WO2012/152481
PCT Pub. Date: Nov. 15, 2012

(65) Prior Publication Data
US 2014/0211217 A1    Jul. 31, 2014

(30) Foreign Application Priority Data
May 6, 2011    (DE) .................. 10 2011 075 386

(51) Int. Cl.
G06K 15/10      (2006.01)
G06K 15/02      (2006.01)
B31B 1/88       (2006.01)
B41J 11/00      (2006.01)

(52) U.S. Cl.
CPC ............ *G06K 15/1868* (2013.01); *B31B 1/88* (2013.01); *B41J 11/008* (2013.01); *B31B 2201/88* (2013.01)

(58) Field of Classification Search
USPC ................ 358/1.5, 400, 401, 501; 399/75
See application file for complete search history.

(56) References Cited

U.S. PATENT DOCUMENTS

| 8,668,302 B2* | 3/2014 | Ramesh et al. .................. 347/19 |
| 8,755,732 B2* | 6/2014 | Ehara et al. .................. 399/397 |
| 2005/0286922 A1* | 12/2005 | Oki .................. 399/75 |
| 2007/0024928 A1* | 2/2007 | Ono .................. 358/504 |
| 2007/0206038 A1 | 9/2007 | Baker |

(Continued)

FOREIGN PATENT DOCUMENTS

| CN | 1151552 A | 6/1997 |
| CN | 1688447 A | 10/2005 |

(Continued)

OTHER PUBLICATIONS

International Search Report corresponding to PCT Application No. PCT/EP2012/054628, mailed Jul. 10, 2012 (German and English language document) (5 pages).

*Primary Examiner* — Jerome Grant, II
(74) *Attorney, Agent, or Firm* — Maginot, Moore & Beck LLP

(57) ABSTRACT

A method for printing at least one carrier element, in particular at least one pack, in at least one printing operation includes sensing a position of the at least one carrier element, orienting at least one piece of information on the basis of the sensed position of the at least one carrier element, storing the at least one piece of information in at least one file, and printing the at least one piece of information onto the carrier element.

19 Claims, 3 Drawing Sheets

(56) References Cited

U.S. PATENT DOCUMENTS

| | | | |
|---|---|---|---|
| 2008/0007586 A1* | 1/2008 | Yoshida | B41J 29/393 347/16 |
| 2008/0019727 A1* | 1/2008 | Honma | 399/82 |
| 2010/0253721 A1 | 10/2010 | Matsumoto et al. | |
| 2011/0164258 A1* | 7/2011 | Nakamura | G06T 1/00 358/1.2 |
| 2011/0197127 A1* | 8/2011 | Fux et al. | 715/257 |
| 2011/0211031 A1* | 9/2011 | Satoh et al. | 347/104 |
| 2013/0335473 A1* | 12/2013 | Ramesh et al. | 347/15 |
| 2014/0042695 A1* | 2/2014 | Maejima et al. | 271/314 |

FOREIGN PATENT DOCUMENTS

| | | | | |
|---|---|---|---|---|
| CN | 101219723 A | 7/2008 | | |
| CN | 101437683 A | 5/2009 | | |
| DE | 10 2007 018 903 A1 | 10/2008 | | |
| DE | 10 2008 056 904 A1 | 4/2010 | | |
| EP | 1 847 397 A2 | 10/2007 | | |
| EP | 1 433 143 B1 | 7/2008 | | |
| JP | 2013160797 | * | 8/2013 | G03G 15/00 |

\* cited by examiner

METHOD FOR PRINTING AT LEAST ONE CARRIER ELEMENT

This application is a 35 U.S.C. §371 National Stage Application of PCT/EP2012/054628, filed on Mar. 16, 2012, which claims the benefit of priority to Serial No. DE 10 2011 075 386.9, filed on May 6, 2011 in Germany, the disclosures of which are incorporated herein by reference in their entirety.

BACKGROUND

One method for printing at least one carrier element, which comprises at least one printing operation, is already known.

SUMMARY

The disclosure proposes a method for printing at least one carrier element which comprises at least one printing operation, wherein in one step a position of the at least one carrier element is sensed, in a further step at least one piece of information is oriented on the basis of the sensed position of the at least one carrier element, wherein the at least one piece of information is stored in at least one file, and in at least one further step at least one piece of information is printed onto the carrier element.

In this connection, "carrier element" is to be understood in particular to mean an element which is provided to be printed. In this connection, "provided" is to be understood in particular to mean "specifically designed", "specifically configured" and/or "specifically equipped". In a particularly preferred exemplary embodiment, the carrier element is formed as a pack. The carrier element is preferably at least partly formed of paperboard, paper and/or board. As a result, an advantageously good printability of the carrier element can be achieved. In this connection, a "position" of the carrier element is to be understood in particular to mean a position of the carrier element which the carrier element has in an apparatus which is provided to print the carrier element. If the position of the carrier element does not coincide with a predefined reference position of the carrier element, then a preferred accuracy of the printing operation and thus of the printed image produced cannot be ensured. The reference position can preferably be predefined by an arithmetic logic unit of the apparatus.

By means of orienting the at least one piece of information, a deviation of the position of the carrier element from the reference position can advantageously be compensated for simply and a preferably precise printing result can be achieved. In this connection, "orientation" is to be understood in particular to mean an operation in which a position of the at least one piece of information is changed. Preferably, the position of the at least one piece of information is changed such that the deviation of the position of the carrier element from the reference position is at least substantially compensated for or rectified. In a particularly preferred exemplary embodiment, the position of the at least one piece of information in the file, in which the at least one piece of information is stored, is changed.

It is additionally proposed that the orientation of the at least one piece of information be carried out by adapting a position of the at least one piece of information in the file. As a result, in particular in the case of carrier elements which have a large two-dimensional extent and/or a high weight, precise printing can be achieved in an advantageously simple way.

Alternatively, it is also conceivable to displace the carrier element and/or the at least one part of the printing unit as a function of the sensed position of the at least one carrier element, so that the deviation of the position of the carrier element from the reference position is advantageously compensated for simply.

The position of the at least one carrier element can be sensed directly and/or indirectly. In this connection, "directly" is intended to be understood in particular to mean that the position of the at least one carrier element itself and completely can be detected and evaluated in a single step. In this connection, "indirectly" is to be understood in particular to mean that in at least one step a position of a further element, which is preferably firmly connected to the carrier element, and/or a position of a sub-region of the carrier element is detected, and in at least one further step by using which it is possible to draw conclusions about the position of the carrier element.

In this connection, a "piece of information" is to be understood in particular to mean a feature which in particular preferably refers a user to product-specific properties of a product. The piece of information can be formed by a manufacturer-dependent or manufacturer-independent article designation, by hints on use and hazards, by a manufacturer logo and/or by further features appearing expedient to a person skilled in the art.

The method can be provided such that in each case one carrier element is printed. In a particularly preferred exemplary embodiment, the method is configured such that at least two carrier elements can be printed simultaneously in a single printing operation. As a result, an advantageously low processing time of the carrier elements can be achieved.

By means of the method according to the disclosure, an advantageously precise printing result can be achieved. As a result, it is possible to use carrier elements which are preferably configured uniformly and have free areas in which at least one piece of information can be printed on by means of the method. The piece of information can be provided in particular to individualize at least one of the carrier elements or to distinguish the same unambiguously from at least one other of the carrier elements. As a result, costs can advantageously be saved. In addition, an advantageously short manufacturing time of a carrier element can be achieved. The carrier elements printed in accordance with the method of the disclosure preferably form a pack and/or a label, in particular of a tool insert for handheld machine tools. In a particularly preferred exemplary embodiment, the carrier element is provided to form a folding box when assembled. However, other configurations and uses of the carrier elements printed in accordance with the method of the disclosure which appear to be expedient to a person skilled in the art are conceivable.

Furthermore, it is proposed that a position of at least one reference element be determined and the orientation of the at least one piece of information be carried out at least substantially by using the determined position of the at least one reference element. In this connection, "reference element" is intended to be understood in particular to mean an element which forms a fixed reference point of the carrier element and by using the position of which it is possible to draw conclusions about the position of the carrier element. In a particularly preferred exemplary embodiment, the reference point is configured to be machine-readable. The reference element is preferably applied to the carrier element before the carrier element is printed in accordance with the method of the disclosure. The reference element can be adhesively bonded to the carrier element, printed on, pressed in or applied in another way appearing to be expedient to a person skilled in the art. In a particularly preferred exemplary embodiment, an arithmetic logic unit can be provided, which is provided to calculate the position of the carrier element by using the sensed position of the at least one reference element by means of a stored calculation algorithm.

As a result, advantageously simple and quick, in particular machine, detection of the position of the carrier element can be achieved, which means that preferably low expenditure on time and costs can be achieved.

Furthermore, it is proposed that the position of the at least one reference element of the carrier element be determined at least substantially by machine. In this connection, "by machine" is intended to be understood in particular to mean that the position of the at least one carrier element is detected or sensed without any human intervention and preferably automatically. This can preferably be achieved by means of at least one sensor. The sensor can in particular be configured mechanically, magnetically, electronically and/or optically.

As a result, advantageously simple and preferably precise detection of the position of the carrier element can be achieved. In addition, staff can advantageously be saved thereby, and thus preferably low costs can be achieved.

Furthermore, it is proposed that, by using the position of the at least one reference element of the carrier element, the printing operation be influenced at least substantially by machine, so that the at least one piece of information can be printed at least substantially in accurate register in at least one free area of the carrier element. In this connection, "at least substantially in accurate register" is to be understood in particular to mean a deviation from an ideal position which is in particular less than 10 mm, preferably less than 5 mm and particularly preferably less than 3 mm. In a particularly preferred exemplary embodiment, the deviation is less than 1 mm.

As a result, a preferably precise printing result is achieved, which means that it is possible to achieve a high-quality appearance of the carrier element which has been printed in accordance with the method of the disclosure.

In addition, is it is proposed that a file which comprises the at least one piece of information which is printed onto the carrier element be made available via online ripping for a printing operation. In this connection, "online ripping" is to be understood in particular to mean a method in which a file which comprises at least one graphic which forms the at least one piece of information is converted into readable signals for the printing unit, wherein a transfer of the signals is transferred directly to the printing unit, i.e. without the signals being stored temporarily in a data memory. As a result, the printing operation, and thus the method according to the disclosure, can advantageously be configured quickly and simply.

Furthermore, it is proposed that, by using the at least one reference element, a file which comprises the at least one piece of information is chosen at least substantially by machine from at least two files which each comprise different pieces of information. This distinction can be achieved by different positionings and/or by different shapes of the reference elements of the different carrier elements. As a result, the method can advantageously be configured flexibly, simply and in a user-friendly manner.

Furthermore, a carrier element is proposed which is provided to be printed by means of the method according to the disclosure. In a particularly preferred exemplary embodiment, the carrier element at least partly forms a pack and/or a label, in particular of a tool insert. The carrier element is preferably at least partly formed of paperboard, paper and/or board. As a result, an advantageously good printability of the carrier element can be achieved. In addition, advantageously low costs can be achieved. It is also conceivable to form the carrier element from a plastic. As a result, the carrier element can advantageously be configured robustly.

In addition, it is proposed that the carrier element have at least one reference element which is provided to be sensed by at least one sensor. By means of the at least one reference element of the carrier element that can be detected by a sensor, advantageously simple, quick and automatic printing of the carrier element can be achieved by means of the method according to the disclosure.

Furthermore, the disclosure proposes an apparatus which is provided to print the at least one carrier element by means of the method, having at least one printing unit which comprises at least one printing element, having at least one sensor for detecting a position of the carrier element, having at least one computer unit, having at least one printing element and having at least one orientation unit, which is provided to orient at least one piece of information. In a particularly preferred exemplary embodiment, the apparatus is formed as a printing apparatus.

In addition, it is proposed that the at least one sensor comprise at least one optical sensor.

Furthermore, it is proposed that the at least one optical sensor comprise a camera. As a result, the apparatus can advantageously be configured precisely and economically.

In addition, it is proposed that the at least one arithmetic logic unit be provided to calculate a position of the carrier element by using a position of at least one reference element of the carrier element. In a particularly preferred exemplary embodiment, the arithmetic logic unit is provided to calculate the position of the carrier element by using the sensed position of the at least one reference element, by means of a stored calculation algorithm.

As a result, advantageously simple and quick, in particular machine, detection of the position of the carrier element can be achieved, which means that preferably low expenditure on time and costs can be achieved.

BRIEF DESCRIPTION OF THE DRAWINGS

Further advantages can be gathered from the following description of the drawings. An exemplary embodiment of the disclosure is illustrated in the drawings. The drawings, the description and the claims contain numerous features in combination.

Those skilled in the art will expediently also consider the features individually and combine them to form expedient further combinations.

DETAILED DESCRIPTION

Figure 1:
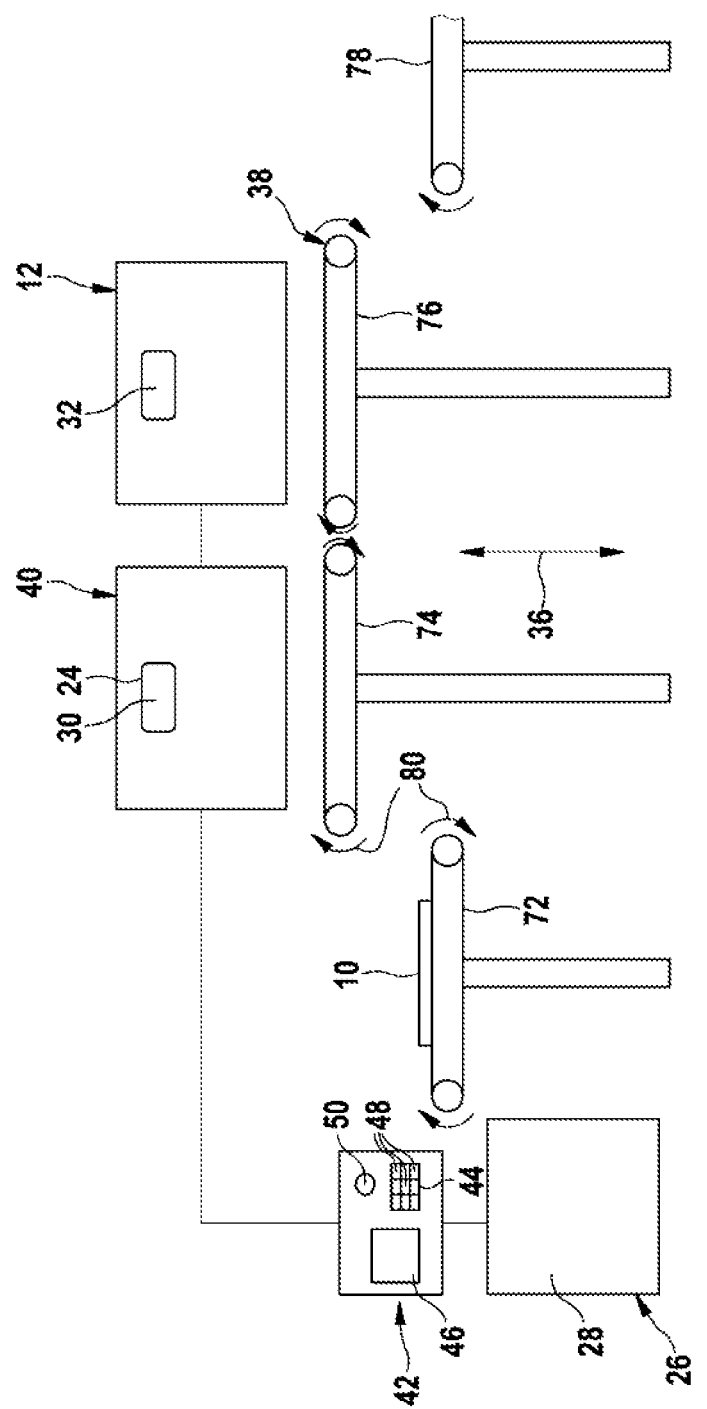
FIG. 1 shows an apparatus according to the disclosure in a schematic illustration.

FIG. 1 illustrates an apparatus. The apparatus is formed as a printing apparatus. The apparatus is provided to print carrier elements 10 with pieces of information 14, 16, 18, 20.

The apparatus has a feed and transport unit 38. The feed and transport unit 38 has four transport elements 72, 74, 76, 78. The transport elements 72, 74, 76, 78 are formed by transport belts. In addition, the feed and transport unit can have an insertion stack (not illustrated), which is provided to receive at least one stack of carrier elements. The transport elements 72, 74, 76, 78 are each designed to be height-adjustable in the vertical direction 36. The feed and transport unit 38 is provided to hold and to guide carrier elements 10 within the apparatus during a processing process. A carrier element 10 is placed on the first transport element 72 and guided in the transport direction 80 of the transport element 72 toward the second transport element 74. The first transport element 72 is displaced in the vertical direction 36 such that the first transport element 72 and the second transport element 74, viewed in the vertical direction 36, are at the same height. The carrier element 10 is then transferred from the first transport element 72 to the second transport element 74.

On the second transport element 74, the carrier element 10, viewed in the vertical direction 36, remains lying under a sensor unit 40. The sensor unit 40 comprises a sensor 24. The sensor 24 is comprises an optical sensor. The optical sensor is formed by a camera 30. The sensor 24 is provided to detect, during a printing operation, reference elements 22 of the carrier element 10 to be printed. The sensor 24 is provided to detect a position of the reference elements 22 of the carrier element 10 to be printed. The sensor 24 is provided to record the position of the reference elements 22 of the carrier element 10 to be printed in a graphic form and to convert said position into electrical signals. The sensor 24 transmits the electrical signals to an arithmetic logic unit 26.

The arithmetic logic unit 26 is provided to evaluate the electrical signals from the sensor 24. The arithmetic logic unit 26 is provided to calculate a position of the carrier element 10 by using the sensed position of the reference elements 22 of the carrier element 10, which are provided to the arithmetic logic unit 26 as electrical signals. To this end, a calculation algorithm is stored in the arithmetic logic unit 26. The arithmetic logic unit 26 compares the determined position of the carrier element 10 with a predefined reference position of the carrier element 10.

The arithmetic logic unit comprises an orientation unit 28. If the position of the carrier element 10 deviates from the reference position, the orientation unit 28 generates an electrical signal. The orientation unit is provided to influence an orientation of the pieces of information 14, 16, 18, 20 on the basis of the output signal from the arithmetic logic unit 26. The electrical signal causes at least one piece of information 14, 16, 18, 20 to be oriented as a function of the sensed position of the carrier elements 10. A file is provided which comprises the at least one piece of information 14, 16, 18, 20. Four different groups of pieces of information 14, 16, 18, 20 are provided. During the orientation of the pieces of information 14, 16, 18, 20, the file is changed. As a result of adapting the orientation of the pieces of information 14, 16, 18, 20, a deviation of the position of the carrier element 10 from the predefined reference position is compensated for.

The arithmetic logic unit 26 is provided to prepare the pieces of information 14, 16, 18, 20 as a graphic for the printing operation. The graphic is provided as an image file or text file. The file is passed on to the apparatus.

The apparatus additionally has a printing unit 12, illustrated schematically. The printing unit 12 is constructed as an inkjet printing unit. The printing unit 12 comprises a printing element 32. The printing element 32 is formed as a print head. The printing element 32 is provided to be in direct contact with a surface 34 of the carrier element 10 during a printing operation. In the process, the printing element 32 transfers the pieces of information 14, 16, 18, 20 onto the carrier element 10.

After the position of the carrier element 10 has been detected by the sensor 24 of the sensor unit 40, the carrier element 10 is transported by the second transport element 74 at right angles to the vertical direction 36 toward the third transport element 76. The second transport element 74 is displaced in the vertical direction 36 such that the second transport element 74 and the third transport element 76, viewed in the vertical direction 36, are at the same height. The carrier element 10 is then transferred from the second transport element 74 to the third transport element 76.

On the third transport element 76, the carrier element 10, viewed in the vertical direction 36, remains lying under the printing unit 12 of the apparatus. The carrier element 10 is then printed by the printing element 32 of the printing unit 12 with the pieces of information 14, 16, 18, 20, the positions of which are aligned with that of the carrier element 10.

After the carrier element 10 has been printed by the printing element 32 of the printing unit 12, the carrier element 10 is transported from the third transport element 76 at right angles to the vertical direction 36 toward the fourth transport element 78. The third transport element 76 is displaced in the vertical direction 36 such that the third transport element 76 and the fourth transport element 78, viewed in the vertical direction 36, are at the same height. The carrier element 10 is then transferred from the third transport element 76 to the fourth transport element 78. An operator of the apparatus can then remove the printed carrier element 10 from the fourth transport element 78 of the feed and transport unit 38.

In addition, the apparatus has an operating unit 42. The operating unit 42 comprises an input area 44 and a display 46. The display 46 is provided to inform an operator about the status of a printing operation. Via the input area 44, an operator is able to control the apparatus and the printing operation and make adjustments. The input area 44 has a plurality of pushbuttons 48. In addition, the apparatus has an emergency stop switch 50. The emergency stop switch 50 is arranged beside the operating unit 42.

Figure 2:
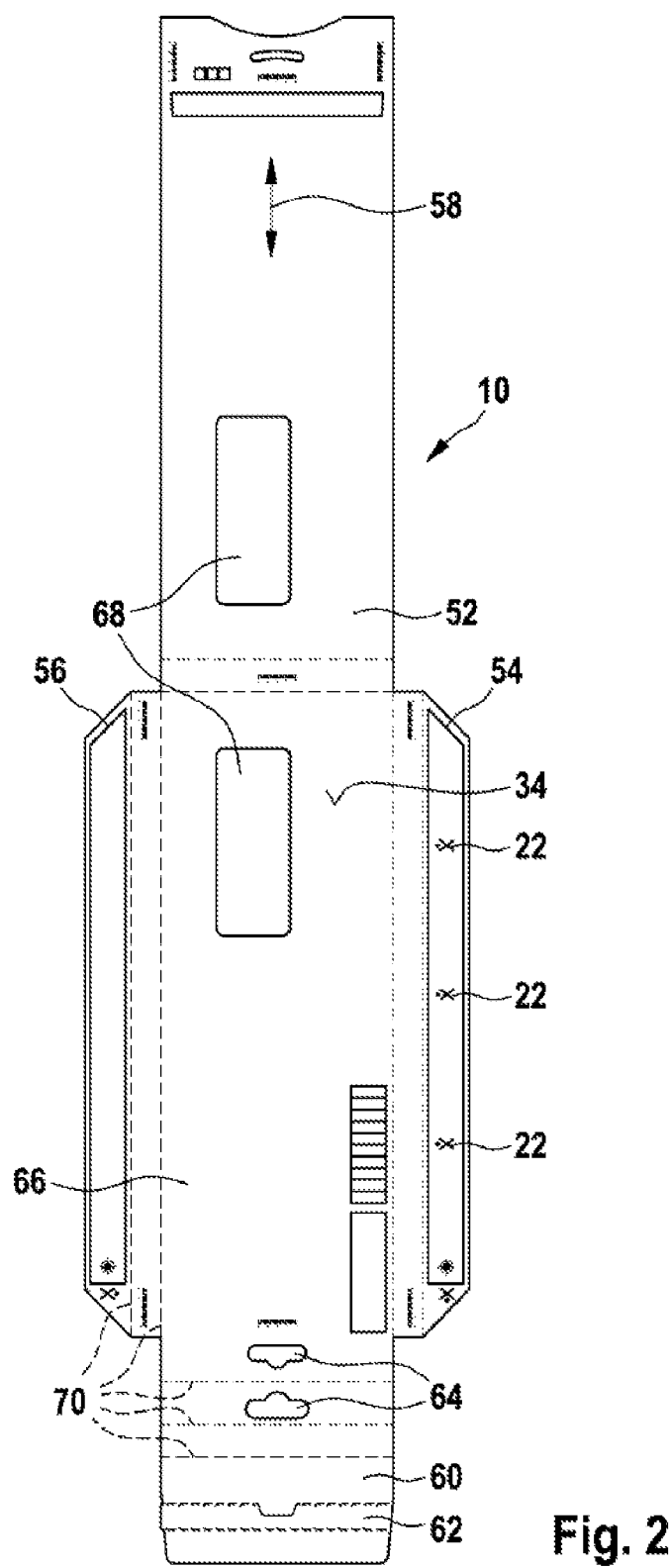
FIG. 2 shows a plan view of a carrier element according to the disclosure before a method according to the disclosure is used.

In FIG. 2, the carrier element 10 according to the disclosure is shown in a state in which the carrier element 10 has not yet been printed by means of the method according to the disclosure. The carrier element 10 is formed from board. The carrier element 10 is designed as a pack. The carrier element 10 has a base 52. The base 52 has two lateral flaps 54, 56. The flaps 54, 56 are arranged in a main direction of extent 58 of the carrier element 10 along sides of the base 52. One of the two flaps 54 has four reference elements 22. The other flap 56 has one reference element 22. The reference elements 22 are each formed by a cross. Each reference element 22 additionally has a dot. The reference elements 22 are configured such that they can be read by the sensor 24.

The base 52 additionally has a further flap 60. The further flap 60 is arranged at right angles to the main direction of extent 58 of the carrier element 10 on a top side of the base 52. The further flap 60 comprises a tear-off element 62. In addition, the further flap 60 comprises a suspension element 64.

The base 52 additionally comprises an information area 66. The information area 66 is provided to be printed with pieces of information 14, 16, 18, 20 by means of the method of the disclosure. The base 52 further has a two window elements 68. One of the two window elements 68 is enclosed by the information area 66.

Furthermore, the base 52 has folding elements 70. The folding elements 70 are formed by straight lines. The folding elements 70 are provided to fold the base 52 along these folding elements 70 during a folding operation after the printing operation.

The carrier element 10 is formed as a blank of a folding box. The folding box is designed to receive small parts when folded. The small parts can be formed by screws, nuts, abrasive sheets, abrasive paper blanks, nails or other small parts appearing expedient to a person skilled in the art. The small parts are sold in the folded folding box.

Figure 3:
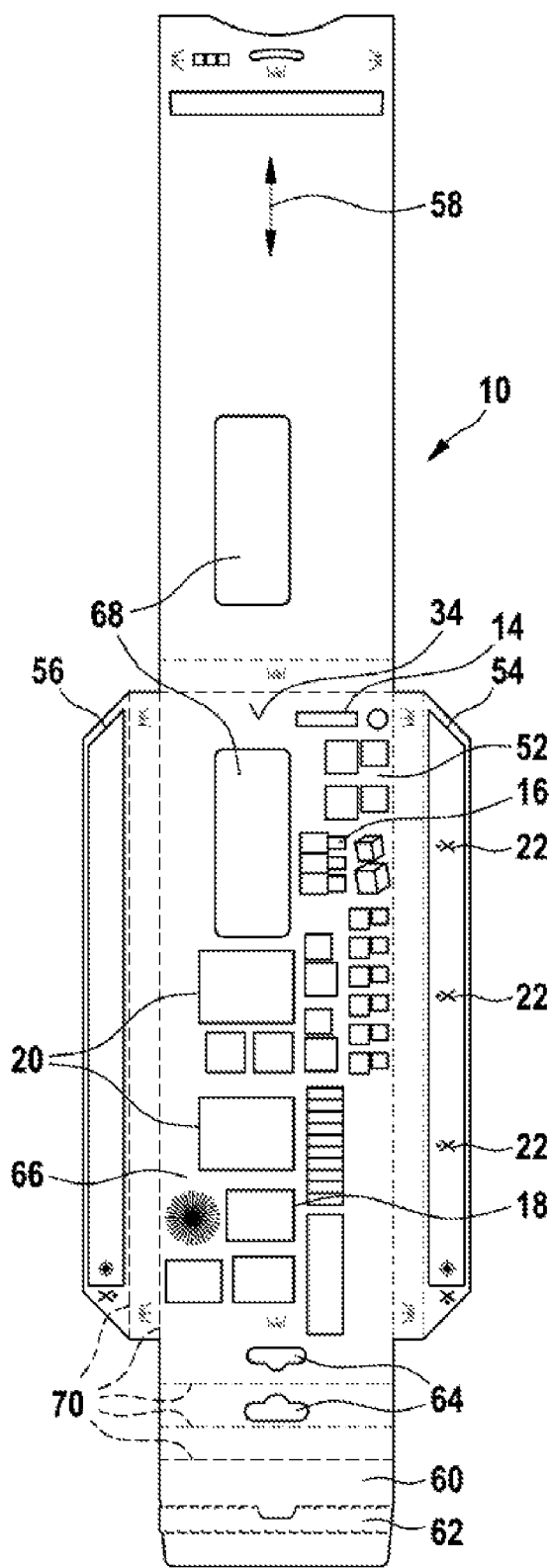
FIG. 3 shows a plan view of a carrier element printed by the method according to the disclosure.

In FIG. 3, the carrier element 10 is shown in a printed state. The information area 66 has been printed with a first piece of information 14, which is formed by a manufacturer logo. The manufacturer logo refers a user to a manufacturer of the small parts included in the folding box. Furthermore, the information area 66 comprises a further piece of information 16, formed by product-specific information, relating to the small parts later contained in the folding box. The carrier element 10 shown in FIG. 3 is provided as a folding box to receive abrasive paper blanks, not illustrated, in a folded state. The product-specific information is formed by a statement relating to grain size, to areas of application, to suitable hand-held machine tools and materials for which the abrasive paper blanks are suitable. In addition, the information area 66 has a further piece of information 18, which is formed by images of an application of the small parts contained in the folding box. Furthermore, a further piece of information 20, formed by machine-readable EAN codes, is printed on in the information area 66.

When the carrier element 10 is folded, an adhesive is applied to the two lateral flaps 54, 56 and to the further flap 60 and bonded to the base 52 of the carrier element 10. The suspension element 64 is provided to hang up the folding box, for example in a saleroom. The two window elements 68 are arranged to lie opposite each other when the carrier element 10 is folded. Through the window elements 68, a user can view the content of the folding box, which is formed by small parts. The tear-off element 62 is provided to open the folding box simply and quickly.

The invention claimed is:

1. A method for printing a carrier element including at least one printing operation, comprising:
sensing a position of the carrier element by determining a position of at least one reference element of the carrier element; orienting at least one piece of information on the basis of the sensed positon of the carrier element at least substantially based on the determined position of the at least one reference element; and printing the oriented at least one piece of information onto the carrier element.

2. The method as claimed in claim 1, wherein the orientation of the at least one piece of information includes adapting a position of the at least one piece of information in the file.

3. The method as claimed in claim 1, wherein the position of the at least one reference element of the carrier element is determined at least substantially by machine.

4. The method as claimed in claim 1, wherein the printing of the stored at least one piece of information is influenced at least substantially by machine by using the determined position of the at least one reference element of the carrier element.

5. The method as claimed in claim 1, wherein the printing of the stored at least one piece of information includes:
converting the oriented at least one piece of information in the at least one file to signals readable by a printing unit; transferring the signals to the printing unit without storing the signals in a data memory; and printing the oriented at least one piece of information onto the carrier element with the printing unit based on the signals.

6. The method as claimed in claim 1, wherein, by using the at least one reference element, a file which comprises the at least one piece of information is chosen at least substantially by machine from at least two files which each comprise at least one different piece of information.

7. The method as claimed in claim 1, wherein the carrier element is configured as a pack.

8. The method of claim 1, wherein the step of sensing the position of the carrier element is accomplished by an arithmetic logic unit operable to calculate the position based on the determined position of the at least one reference element using a stored algorithm.

9. The method of claim 1, further comprising, applying a reference element to the carrier element before the step of sensing a position.

10. The method of claim 9, wherein the reference element is applied by one of adhesively bonding, printing or pressed into the carrier element.

11. The method as claimed in claim 1, wherein the at least one piece of information is stored in at least one file.

12. A printed carrier element produced according to a method comprising:
sensing a position of the carrier element by determining a position of at least one reference element of the carrier element;
orienting at least one piece of information on the basis of the sensed positon of the at least one reference element; and
printing the oriented at least one piece of information onto the carrier element.

13. The carrier element as claimed in claim 12, wherein the carrier element is configured as a pack.

14. An apparatus configured to print a carrier element, comprising: at least one printing unit including at least one printing element; at least one sensor configured to sense a position of at least one reference element of the carrier element; and at least one arithmetic logic unit configured to determine a positon of the carrier element based on the position of the at least one reference element and to orient at least one piece of information, at least substantially using the determined position of the at least one reference element, wherein the at least one printing unit is configured to print the oriented at least one piece of information on the carrier element.

15. The apparatus as claimed in claim 14, wherein the at least one sensor comprises at least one optical sensor.

16. The apparatus as claimed in claim 15, wherein the at least one optical sensor comprises a camera.

17. The apparatus as claimed in claim 14, wherein the at least one arithmetic logic unit is configured to calculate a position of the carrier element by using a position of at least one reference element of the carrier element.

18. The apparatus as claimed in claim 14, wherein the apparatus is configured as a printing apparatus.

19. The apparatus as claimed in claim 14, wherein the at least one piece of information is stored in at least one file.

* * * * *